United States Patent [19]

Wu et al.

[11] Patent Number: 5,668,074
[45] Date of Patent: Sep. 16, 1997

[54] PREPARATION OF CATALYSTS FOR ALKANE/CYCLOALKANE ISOMERIZATION

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 501,625

[22] Filed: Jul. 12, 1995

[51] Int. Cl.⁶ .............................. B01J 23/20; B01J 21/04; B01J 23/42; B01J 23/44
[52] U.S. Cl. .................. 502/332; 502/325; 502/333; 502/334; 502/339; 502/353; 502/354
[58] Field of Search .................. 502/325, 332, 502/333, 334, 339, 353, 354

[56] References Cited

U.S. PATENT DOCUMENTS 3,786,001  1/1974  Cornelius et al. ............... 252/464
3,799,867  3/1974  Cardwell et al. ............... 208/139
4,747,933  5/1988  Hibbs ............................. 208/79
5,039,639  8/1991  Khare ............................ 502/36

Primary Examiner—Glenn A. Caldarola
Assistant Examiner—Alexander G. Ghyka
Attorney, Agent, or Firm—K. K. Brandes

[57] ABSTRACT

A material which is effective as a catalyst for isomerizing alkanes and/or cycloalkanes is prepared by a method which comprises incorporating Nb and/or Ta into a reduced material comprising Pt and/or Pd on alumina, followed by heating in a non-reducing gas and heat-treatment with at least one fluoroalkane and/or chlorofluroalkane (preferably $CClF_3$).

20 Claims, No Drawings

PREPARATION OF CATALYSTS FOR ALKANE/CYCLOALKANE ISOMERIZATION

BACKGROUND OF THE INVENTION

This invention relates to the preparation of Group VIII metal-containing catalyst compositions which are effective as catalysts for the isomerization of saturated $C_4$–$C_8$ hydrocarbons.

Supported halogenated Group VIII noble metal catalysts for alkane and/or cycloalkane isomerization are well known. Also, the use of tantalum and/or niobium compounds as copromoter(s) for these Group VIII noble metal (preferably platinum) catalysts is known. The present invention is directed to a novel method of preparing a catalyst composition comprising at least one Group VIII noble metal (preferably Pt), at least one compound of Ta and/or Nb, at least one halogen, and alumina as the support material.

SUMMARY OF THE INVENTION

It is an object of this invention to prepare a composition of matter, which is effective as an effective catalyst for isomerizing alkanes and/or cycloalkanes, comprising at least one noble Group VIII metal, at least one compound of niobium and/or tantalum, and alumina. Other objects and advantages will become apparent from the detailed description and the appended claims.

In accordance with this invention a method of preparing a composition (which is an effective catalyst for isomerizing saturated hydrocarbons) comprises the steps of:

(a) treating a starting material which comprises (i) at least one compound of at least one Group VIII noble metal selected from the group consisting of platinum and palladium and (ii) alumina as the support material with a reducing gas at a temperature of about 300°–600° C. for a time period of at least about 10 minutes;

(b) incorporating into the reduced material obtained in step (a) at least one compound of at least one Group VB metal selected from the group consisting of niobium and tantalum;

(c) heating the material obtained in step (b) in a non-reducing gas at a temperature of about 300°–500° C. for a time period of at least about 10 minutes; and (d) treating the material obtained in step (c) with at least one halocarbon compound selected from the group consisting of fluoroalkanes and chlorofluoroalkanes at a temperature of about 200°–500° C. for a time period of at least about 10 minutes.

DETAILED DESCRIPTION OF THE INVENTION

Any suitable starting material can be used in step (a) of the method of this invention. Generally, the starting material has been prepared by impregnating alumina with dissolved compound(s) of Pt or Pd or both metals. Generally, the thus-impregnated alumina material is then substantially dried (at any effective, well known drying conditions), and heated (preferably in a molecular oxygen-containing gas atmosphere such as air, at a temperature of about 300°–650° C.) for a time period of at least about 10 minutes (preferably about 0.5–20 hours).

Any suitable alumina material can be used in the preparation of the starting material used in step (a). Suitable aluminas include (but are not limited to) hydrated aluminas (such as beohmite, pseudoboehmite, bayerite), alpha-alumina, beta-alumina, gamma-alumina, delta-alumina, eta-alumina and theta-alumina, preferably gamma-alumina. The alumina material generally has a surface area (determined by the BET method of Brunauer, Emmett and Teller employing $N_2$) of about 100–400 $m^2/g$, a pore volume (measured by nitrogen intrusion porosimetry) of about 0.2–1.0 $cm^3/g$, and a particle size of about 8–200 mesh. The alumina particles can be spherical, cylindrical, trilobal, or can have any other suitable shape. The presently preferred alumina particles are cylindrical extrudates. Compounds of Nb and/or Ta (such as $Nb_2O_5$ and/or $Ta_2O_5$) are substantially absent from the starting material.

Preferably, at least one suitable platinum compound (preferably one which is water-soluble) can be used as the at least one Group VIII metal compound for the impregnation of alumina so as to make a starting material used in step (a). Suitable Pt compounds include (but are not limited to) platinum(II) chloride, platinum(IV) chloride, hexachloroplatinic(IV) acid, ammonium hexachloroplatinate(IV), tetrammineplatinum(II) chloride, tetrammineplatinum(II) carbonate, tetrammineplatinum(II) hydroxide, dichlorodiammineplatinum(II), tetrachlorodiammineplatinum(IV), platinum(II) nitrate, platinum(IV) nitrate, hexammineplatinum(II) nitrate, hexammineplatinum(IV) nitrate, diammineplatinum(IV) nitrite, diammineplatinum(II) oxalate, and many other complex (coordination) compounds of divalent and tetravalent platinum. Presently preferred is hexachloroplatinic acid, $H_2PtCl_6$.

Any suitable palladium compound (preferably water-soluble) can be also used as the at least one Group VIII metal compound for the impregnation of alumina so as to make the solid starting material used in step (a). Suitable Pd compounds include (but are not limited to) palladium (II) chloride, palladium(II) nitrate, palladium(II) sulfate, palladium(IV) chloride, hexachloropalladic(IV) acid ($H_2PdCl_6$), ammonium hexachloropalladate(IV), tetramminepalladium(II) nitrate, tetramminepalladium(II) chloride, tetramminepalladium(IV) nitrate, tetramminepalladium(IV) chloride, and other coordination compounds of divalent and tetravalent palladium.

The alumina material can be impregnated with at least one dissolved Group VIII noble metal compound (to make the above-described solid starting material) in any suitable manner, such as by incipient wetness impregnation or by spraying with an impregnating solution containing at least one dissolved Group VIII metal compound. The total concentration of the at least one Group VIII metal compound (i.e., at least one compound of Pt and/or Pd) in the impregnating solution generally is in the range of about 0.01–2.0 mol/l. The solvent of the impregnating solution can be water or an alcohol such as ethanol or methanol. The weight ratio of the Group VIII metal-containing impregnating solution to alumina in the impregnation is such as to attain a weight percentage of about 0.5–3.0 (preferably about 0.1–1.0) weight-% Group VIII metal (on an elemental basis) in the finished composition (i.e., the material obtained in the last step of the preparation method of this invention). Generally, the Group VIII metal-impregnated alumina material is dried (generally, at about 80°–150° C.) and calcined at a temperature of about 300°–650° C. (preferably 450°–550° C.) for a time period of about 0.5–20 hours (preferably about 2–4 hours). This calcining step can be done in an inert atmosphere (i.e., $N_2$, He, Ne, Ar) or (preferably) in an $O_2$-containing atmosphere (e.g., air).

The solid starting material (described above) is treated in step (a) by heating with a reducing gas (preferably a gas stream comprising free hydrogen, more preferably consisting essentially of $H_2$) at a temperature of about 300°–500° C. (preferably about 350°–450° C.), generally for a time period of about 0.1–10 hours (preferably about 0.5–3 hours). Other (less preferred) reducing gases which can also be employed in step (a) include (but are not limited to) carbon monoxide, $C_1$–$C_6$ (such as methane, ethane), $C_2$–$C_6$ mono- and diolefins, mixtures of these reducing carbon compounds, and mixtures containing hydrogen and any of these reducing carbon compounds.

In step (b), the reduced material obtained in step (a) is contacted with at least one Nb(V) compound or at least one Ta(V) compound or a mixture of Nb(V) and Ta(V) compounds. Generally, these compounds are dissolved in at least one suitable solvent, such as water, $C_1$–$C_8$ alkanols, $C_5$–$C_8$ cycloalkanols (e.g., methanol, ethanol, cyclohexanol, and the like), or mixtures of any two or more than two of these solvents. The reduced material from step (a) is then contacted in any suitable manner (such as by incipient wetness impregnation or by spraying) with the solution containing at least one five-valent niobium compound (such as $NbF_5$, $NbCl_5$, $NbBr_5$, $NbOF_3$, $NbOCl_3$ and the like) and/or at least one five-valent tantalum compound (such as $TaF_5$, $TaCl_5$, $TaBr_5$, $TaOF_3$, $TaOCl_5$ and the like). Generally, the concentration of the at least one Nb and/or Ta compound in the impregnating solution is about 0.1–1.0 mol/l. The weight ratio of solution to solid material obtained in step (a) is such as to obtain a material in step (b) which contains about 0.5–10 weight-% Nb or Ta or (Nb+Ta) (on a dry basis). Generally, the material containing Nb and/or Ta is dried in any suitable manner (e.g., by heating in an inert gas at about 80°–150° C. for a time period of at least about 10 minutes) before step (c).

In step (c), the Nb- and/or Ta- impregnated material obtained in step (b) is heated in a non-reducing gas atmosphere at a temperature of about 300°–600° C. (preferably about 350°–500° C.) for a period of time of about 0.2–20 hours (preferably about 0.5–2 hours). Preferably, this step is carried out in an inert gas atmosphere (e.g., $N_2$, He, Ne, Ar, or mixtures thereof). It is possible, yet less preferred, to carry out step (c) or in an $O_2$-containing atmosphere (e.g., air).

Fluoriding step (d) can be carried out by heating with any suitable halocarbon-containing gas, generally at a temperature of about 200°–500° C. (preferably at about 350°–450° C.) for a period of time of about 0.1–2 hours (preferably about 0.2–0.5 hour). Generally, at least one vaporized halocarbon is diluted with at least one inert gas (such as $N_2$, He, Ne and the like), so as to attain a gas mixture which generally contains about 20–99 volume-% of at least one halocarbon. Of course, it is also possible to employ essentially pure halocarbon gases.

The halocarbon employed in fluoriding step (d) is at least one volatile fluoroalkane or at least one chlorofluoroalkane or mixtures thereof. Suitable halocarbons generally contain 1–4 carbon atoms and 1–8 fluorine atoms per molecule. Examples of effective fluoroalkanes include (but are not limited to): $CH_3F$, $CH_2F_2$, $CHF_3$, $CF_4$, $CH_3CHF_2$, $CH_2FCHF_2$, $CH_3CF_3$, $CH_2FCF_3$, $CHF_2CHF_2$, $CHF_2CF_3$, $CF_3CF_3$, $CF_3CF_2CF_3$, and the like, and mixtures thereof. Examples of effective chlorofluoroalkanes include (but are not limited to) $CH_2ClF$, $CHCl_2F$, $CHClF_2$, $CCl_2F_2$, $CClF_3$, $CH_3CClF_2$, $CH_2ClCF_3$, $CHF_2CClF_2$, $CClF_2CClF_2$, $CCl_2FCF_3$, $CClF_2CF_3$, and the like, and mixtures thereof. Mixtures of the above-listed fluorocarbons and chlorofluorocarbons can also be employed. Many of the above-cited haloalkanes are commercially available as refrigerants, e.g., $CCl_2F_2$ (Freon 12), $CClF_3$ (Freon 13), $CF_4$ (Freon 14), $CHClF_2$ (Freon 22) and $CHF_3$ (Freon 23). Presently preferred is $CClF_3$ (chlorotrifluoromethane).

The finished catalyst composition generally contains about 0.05–3 (preferably about 0.1–1.0) weight-% of the at least one Group VIII noble metal (on an elemental basis), about 0.5–10 (preferably about 1–7) weight-% of the at least one Group VB metal (on an elemental basis), and about 3–15 (preferably about 6–10) weight-% fluorine (on an elemental basis). The surface area, pore volume, shape and particle size of the finished catalyst composition are approximately the same as those of the alumina starting material (recited above).

The catalyst of this invention is generally employed in the isomerization of saturated $C_4$–$C_8$ hydrocarbons (preferably normal alkanes). Examples of suitable feed hydrocarbons include (but are not limited to) normal butane, normal pentane, normal hexane, normal heptane, normal octane, cyclohexane, methylcyclopentane, cycloheptane and methylcycloheptane, generally in the presence of hydrogen. These so-called hydroisomerization processes are well known and have been described in the patent literature (e.g., in U.S. Pat. Nos. 4,149,993 and 5,004,859). Generally, hydrogen is mixed with the saturated feed hydrocarbon to form a feed mixture which is contacted with the isomerization catalyst of this invention contained in an isomerization zone. The concentration of the hydrogen in the feed mixture during this contacting step shall be such as to provide a hydrogen:hydrocarbon molar ratio of at least about 0.01:1, generally about 0.01:1 to about 5:1, preferably about 0.02:1 to about 2:1. The basic isomerization reaction conditions are well known and can be varied to achieve the desired conversion of the feed hydrocarbon to the desired isomer in a manner known in the art. Also, the recovery of the product isomer from the reaction mixture can be carried out by any suitable separation technique, such as fractional distillation. Isomerization of normal butane (n-butane) to isobutane is the presently preferred reaction carried out with the catalyst composition of this invention.

Generally, the saturated feed hydrocarbon and $H_2$ are contacted with the catalyst (generally present in a fixed bed) at a reaction temperature of at least about 200° F., preferably at a temperature of about 200°–500° F. In the preferred case of n-butane isomerization, the temperature is generally about 250°–400° F. Generally, the liquid hourly space velocity of the saturated hydrocarbon feed stream, i.e., cc of liquid feed hydrocarbon per cc of catalyst per hour, is about 0.1 to about 15. Generally, the reaction pressure is within the range of 200 psig to about 1500 psig in the isomerization zone. The gas hourly space velocity of the hydrogen feed stream is generally about 10–2,000 (preferably about 50–950) cc $H_2$ per cc catalyst per hour (so as to give the above-recited $H_2$:hydrocarbon ratio). In order to activate the catalyst and to retard its deactivation during the isomerization reaction, about 0.001 to about 1 weight percent chloride is frequently added to the alkane feed, generally in the form of at least one chloroalkane (described above), preferably carbon tetrachloride, chloroform, ethyl chloride or isopropyl chloride.

When the catalyst, after it has been employed in the hydroisomerization process, has lost its activity to the extent that the desired alkane conversion can no longer be attained at the desired reaction temperature, the catalyst can be reactivated by turning off the flow of the saturated feed hydrocarbon while maintaining the flow of the $H_2$ stream through the isomerization catalyst, generally at about the same gas hourly space velocity of $H_2$ as in the isomerization reaction. The temperature in this reactivation step is generally about the same as in the isomerization reaction, but may be readjusted upward or downward to maximize the reactivation effect. In the preferred reactivation mode, a reducing gas stream consisting essentially of hydrogen is passed through the partially deactivated isomerization catalyst bed at a temperature of about 80°–350° F. (preferably about 250°–330° F.) and a GHSV (gas hourly space velocity) of about 10–2,000 cc $H_2$ per cc catalyst per hour (more preferably about 50–950 cc/cc/hour), for a time period of about 2 hours to about 10 days (more preferably about 5 hours to about 7 days). Thereafter, the reactivated catalyst is redeployed in the alkane hydroisomerization of saturated $C_4$–$C_8$ hydrocarbons, as described above.

The following examples are presented to further illustrate the present invention and are not to be construed as unduly limiting the scope of this invention.

EXAMPLE I

This example illustrates the preparation of various $Pt/Al_2O_3$ materials which were then employed as catalysts in n-butane isomerization tests.

Catalyst A (Control), which did not contain any Nb or Ta, was prepared as follows: about 30.0 g alumina (provided by Criterion Catalyst Company, Houston, Tex.) was impregnated (by incipient wetness at room temperature in an air atmosphere) with a solution of 0.26 g $H_2PtCl_6$ in 13.26 g ethanol. After soaking for about 0.5 hour, the impregnated material was air-dried and then dried for 1 hour in nitrogen at 120° C. The dried material was calcined for 2 hours in an oxygen gas stream at 500° C. and reduced for 2 hours in a hydrogen gas stream at 425° C. The thus-reduced material was heated for 1 hour in a helium gas stream at 425° C., heated for 15 minutes at 425° C. in a helium/ chlorotrifluoromethane gas stream (flow rate of He: 300 cc/minute; flow rate of $CClF_3$:200 cc/minute), and cooled in a He gas stream. Catalyst A contained 0.33 weight-% Pt.

Catalyst B (Invention) was prepared essentially in accordance with the procedure for Catalyst A except that alter the reduction with $H_2$ (2 hours at 400° C.), 14.0 g of the $Pt/Al_2O_3$ material was impregnated with a solution of 1.38 g $TaCl_5$ in 6.50 g ethanol. Thereafter, the $Pt/Ta/Al_2O_3$ material was heated for 1 hour in a He stream at 425° C. and then for 15 minutes in a $He/CClF_3$ stream at 425° C. (as described for Catalyst A). Catalyst B contained 0.33 weight-% Pt and 7.0 weight-% Ta.

Catalyst C (Invention) was prepared essentially in accordance with the procedure for Catalyst A, except that after the reduction with $H_2$ (2 hours at 400° C.), 14.0 g of the $Pt/Al_2O_3$ was impregnated with a solution of 1.13 g $NbCl_5$ in 6.50 g ethanol. Thereafter, the $Pt/Nb/Al_2O_3$ material was heated in a He stream and then in a $He/CF_3Cl$ stream (as described for Catalyst A). Catalyst A contained 0.33 weight-% Pt and 2.2 weight-% Nb.

Catalyst D (Invention) was prepared essentially in accordance with the procedure for Catalyst C, except that 14.0 g reduced $Pt/Al_2O_3$ was impregnated with a solution of 2.06 g $NbCl_5$ in 6.50 g ethanol. Catalyst D Contained 0.33 weight-% Pt and 4.1 weight-% Nb.

EXAMPLE II

This example illustrates the use of the catalyst materials described in Example I in the isomerization of n-butane.

Each catalyst (volume: about 15 cc) was placed in a stainless steel reactor tube having an inner diameter of 1 inch and a length of 28 inches. The steel reactor tube was heated to about 275° C. A stream of hydrogen gas was passed through the catalyst bed at a rate of 1.34 cubic feet per hour. The reactor pressure was about 500 psig. Liquid n-pentane was introduced at a rate of 60 cc/hour (liquid hourly space velocity: about 4 cc/cc catalyst/hour), while the flow of the hydrogen gas stream was maintained at about 100 cc/minute. After the hydrogen/n-pentane mixture had passed through the catalyst bed at the above conditions for about 10 minutes, carbon tetrachloride was injected into this feed mixture at a rate of 16 microliters per hour for a time period of up to about 24 hours. Thereafter, the $CCl_4$ feed rate was reduced to 6 microliters per hour, and the test was continued. The isomerization product was analyzed by means of a gas chromatograph. Pertinent catalyst preparation parameters and isomerization test results (obtained at comparable reaction times) are summarized in Table I.

TABLE I

| Catalyst | Wt-% Promoter(s) in Catalyst | n-Pentane Isomerization | | | |
| --- | --- | --- | --- | --- | --- |
| | | Reaction Time (hr.) | Reaction Temp. (°C.) | n-Pentane Conversion (%) | Selectivity to Isopentanes (%) |
| A (Control) | 0.33% Pt | 28 | 275 | 32.2 | 89.6 |
| B (Invention) | 0.33% Pt + 70% Ta | 28 | 275 | 55.8 | 88.8 |
| C (Invention) | 0.33% Pt + 2.2% Nb | 28 | 275 | 43.0 | 89.9 |
| D (Invention) | 0.33% Pt + 4.1% Nb | 28 | 275 | 51.5 | 89.8 |

NOTE: The isomerization products contained minor amounts of isobutane and $C_6$+ alkanes.

Test data in Table I clearly show the beneficial effect of the presence of Ta or Nb in Catalysts B-D on their n-pentane isomerization activity.

EXAMPLE III

This example illustrates the criticality of specific preparation parameters in the preparation of $Pt/Ta/Al_2O_3$ and $Pt/Nb/Al_2O_3$ catalysts.

Catalyst E (Invention) was prepared substantially in accordance with the procedure for Catalyst C (Example I). Catalyst F contained about 0.24 weight-% Pt and 3.2 weight-% Nb Catalyst F (Control) was prepared substantially in accordance with the procedure for Catalyst C, except that after the impregnation with $NbCl_5$ (as described for Catalyst A) the thus-impregnated catalyst was heated with $H_2/CClF_3$ (rather than $He/CClF_3$) at 425° C. for 15 minutes. Catalyst F contained about 0.24 weight-% Pt and 3.7 weight-% Nb.

Catalyst G (Control) was prepared by impregnating alumina with a solution of $NbCl_5$ in ethanol under an argon atmosphere. The Nb-impregnated alumina was heated for 1 hour in $N_2$ and 425° C. and then calcined for 16 hours in air at 485° C. The calcined material was impregnated with a solution of 0.255 g $H_2PtCl_6$ in ethanol, dried, heated for 2 hours in air at 500° C., then heated for 2 hours in hydrogen at 425° C., thereafter heated for 15 minutes in a He/CClF$_3$ gas mixture at 425° C., and finally cooled in a He stream to 150° C. Catalyst G contained 0.29 weight-% Pt and 2.4 weight-% Nb.

Catalyst H (Control) was prepared substantially in accordance with the procedure for Catalyst G except that the final heating step was carried out with a mixture of hydrogen and CClF$_3$ (rather than with a mixture of helium and CClF$_3$). Catalyst H contained 0.29 weight-% Pt and 7.4 weight-% Nb.

Catalysts E-H were tested for their alkane and cycloalkane isomerization activities in batch (autoclave) tests at room temperature (about 25° C.) employing a feed containing about 85 weight-% n-hexane and about 11 weight-% methylcyclopentane (MCP). About 10 g of each catalyst per 100 cc of the hydrocarbon feed mixture was employed in all tests. Hexane and MCP conversions (to isohexanes and cyclohexane, respectively) are summarized in Table II.

TABLE II

| Catalyst | Reaction Time (Hr.) | Conversion of Hexane (%) | Conversion of MCP (%) |
|---|---|---|---|
| E (Invention) | 16 | 1.6 | 14.3 |
| F (Control) | 16 | 0 | 0 |
| G (Control) | 16 | 0 | 0 |
| H (Control) | 16 | 0 | 0 |

Test data in Table II show that control Catalyst F (which was prepared by a method comprising reduction with $H_2$ after the addition of a Nb compound to the Pt/Al$_2$O$_3$ base catalyst) and control Catalysts G and H (which were prepared by methods comprising addition of NbCl$_5$ to alumina before impregnation with a Pt compound and before reduction with $H_2$) showed essentially no isomerization activity at the above-described test conditions, whereas invention Catalyst E (which was prepared by the claimed method of this invention) which was active.

Reasonable variations, modifications and adaptations for various conditions and reactants can be made within the scope of the disclosure and the appended claims without departing from the scope of this invention.

That which is claimed:

1. A method of preparing a composition of matter comprising the steps of:
    (a) treating a starting material which comprises (i) at least one compound of at least one Group VIII noble metal selected from the group consisting of platinum and palladium and (ii) alumina as the support material with a reducing gas at a temperature of about 300°–600° C. for a time period of at least about 10 minutes;
    (b) incorporating into the reduced material obtained in step (a) at least one compound of at least one Group VB metal selected from the group consisting of niobium and tantalum;
    (c) heating the material obtained in step (b) in a non-reducing gas at a temperature of about 300°–500° C. for a time period of at least about 10 minutes; and
    (d) treating the material obtained in step (c) with at least one halocarbon compound selected from the group consisting of fluoroalkanes and chlorofluoroalkanes at a temperature of about 200°–500° C. for a time period of at least about 10 minutes.

2. A method in accordance with claim 1 wherein said reducing gas employed in step (a) comprises free hydrogen.

3. A method in accordance with claim 1, wherein said reducing gas employed in step (a) is a gas stream consisting essentially of $H_2$, and the time period of step (a) is about 10 minutes–10 hours.

4. A method in accordance with claim 3, wherein said time period of step (a) is about 0.5–3 hours, and the temperature of step (a) is about 350°–450° C.

5. A method in accordance with claim 2, wherein the content of said at least one Group VIII noble metal in said starting material is about 0.05–3.0 weight percent on an elemental basis.

6. A method in accordance with claim 5, wherein said at least one Group VIII noble metal is platinum.

7. A method in accordance with claim 5, wherein said at least one Group VIII noble metal is palladium.

8. A method in accordance with claim 2, wherein said at least one Group VB metal is niobium.

9. A method in accordance with claim 2, wherein said at least one Group VB metal is tantalum.

10. A method in accordance with claim 2, wherein the material obtained in step (b) is dried before step (c).

11. A process in accordance with claim 10, wherein said material after having been dried contains about 0.5–10 weight-% of said at least one Group VB metal.

12. A method in accordance with claim 2, wherein heating step (c) is carried out in an inert gas atmosphere for a time period of about 0.2–20 hours.

13. A method in accordance with claim 12, wherein step (c) is carried out at a temperatures of about 350°–500° C. for a time period of about 0.5–2 hours.

14. A method in accordance with claim 2, wherein step (d) is carried out for a time period of about 10 minutes–2 hours.

15. A method in accordance with claim 14, wherein said at least one halocarbon compound employed in step (d) contains about 1–4 carbon atoms and 1–8 fluorine atoms per molecule, said time period is about 0.2–0.5 hour, and the temperature of step (d) is about 350°–450° C.

16. A method in accordance with claim 15, wherein said at least one halocarbon compound is at least one fluoroalkane.

17. A method in accordance with claim 15, wherein said at least one halocarbon compound is at least one chlorofluoroalkane.

18. A method in accordance with claim 17, wherein said at least one chlorofluoroalkane is chlorotrifluoromethane.

19. A method in accordance with claim 15, wherein step (d) is carried out with a gas mixture containing at least one inert gas and about 20–99 volume-% of said at least one halocarbon compound.

20. A method in accordance with claim 1, wherein the material obtained in step (d) contains about 0.05–3 weight-% of said at least one Group VIII noble metal, about 0.5–10 weight percent of said at least one Group VB metal, and about 3–15 weight percent of fluorine.

* * * * *